United States Patent
Zhu et al.

(10) Patent No.: US 12,538,099 B2
(45) Date of Patent: Jan. 27, 2026

(54) METHODS AND DEVICES FOR ENHANCING MULTICAST AND BROADCAST SERVICES

(71) Applicant: ZTE Corporation, Shenzhen (CN)

(72) Inventors: Hao Zhu, Shenzhen (CN); Tao Qi, Shenzhen (CN); Lin Chen, Shenzhen (CN); Liping Wang, Shenzhen (CN); Xueying Diao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 399 days.

(21) Appl. No.: 18/108,742

(22) Filed: Feb. 13, 2023

(65) Prior Publication Data

US 2023/0199437 A1    Jun. 22, 2023

Related U.S. Application Data

(63) Continuation of application No. PCT/CN2020/122713, filed on Oct. 22, 2020.

(51) Int. Cl.
*H04W 4/06* (2009.01)
*H04L 1/1812* (2023.01)

(52) U.S. Cl.
CPC ............. *H04W 4/06* (2013.01); *H04L 1/1812* (2013.01)

(58) Field of Classification Search
CPC ................................ H04W 4/06; H04L 1/1812
See application file for complete search history.

(56) References Cited

U.S. PATENT DOCUMENTS

| 12,219,391 B2 * | 2/2025 | Kim | H04L 47/34 |
| 2005/0074024 A1 | 4/2005 | Kim et al. | |

(Continued)

FOREIGN PATENT DOCUMENTS

| CN | 110505160 A | 11/2019 |
| CN | 110769377 A | 2/2020 |

(Continued)

OTHER PUBLICATIONS

Huawei et al: Dynamic switch between PTP and PTM for MBS bearer, 3GPP Draft; R2-2007026, 3rd Generation Partnership Project (3GPP), https://www.3gpp.org/ftp/tsg_ran/WG2_RL2/TSGR2_111-e/Docs/R2-2007026.zip Re-2007026. doc (Year: 2020).*

(Continued)

*Primary Examiner* — Ayman A Abaza
*Assistant Examiner* — Benjamin T. Ranew
(74) *Attorney, Agent, or Firm* — Crowell & Moring LLP

(57) ABSTRACT

The present disclosure describes methods, system, and devices for receiving multicast and broadcast service (MBS) data by a group of second ends from a first end. One method includes receiving, by a second packet data convergence protocol (PDCP) entity at a second end, the MBS data from a first PDCP entity at the first end. Another method includes receiving, by a second acknowledge mode (AM) point-to-multipoint (PTM) radio link control (RLC) entity at a second end, the MBS data from a first AM PTM RLC entity at the first end. Another method includes receiving, by a second end, a piece of information sent from the first end, wherein the piece of information comprises at least one of the following: a first service identity indicating a MBS service or session in RAN, an indication on whether hybrid automatic repeat request (HARQ) feedback is enabled or disabled.

18 Claims, 12 Drawing Sheets

(56) References Cited

U.S. PATENT DOCUMENTS

| | | | |
|---|---|---|---|
| 2021/0068176 A1 | 3/2021 | Luo et al. | |
| 2023/0308221 A1* | 9/2023 | Kadiri | H04W 28/02 |

FOREIGN PATENT DOCUMENTS

| | | |
|---|---|---|
| KR | 10-2005-0019028 | 2/2005 |
| WO | WO 2020035795 A1 | 2/2020 |

OTHER PUBLICATIONS

Korean Office Action and English translation regarding 10-2023-7005754 dated Jul. 31, 2024, 7 pages.

Korean language Notice of Allowance with English summary translation regarding Korean Patent Application No. 10-2023-7005754 dated Apr. 10, 2025 (8 pages).

European Patent Office Communication pursuant to Article 94(3) EPC regarding Application No. 20 958 152.9 dated Feb. 5, 2025 (5 pages).

"3rd Generation Partnership Project; Technical Specification Group Radio Access Network; NR; Packet Data Convergence Protocol (PDCP) specification (Release 16)," 3GPP Draft; 38323-G20, 3rd Generation Partnership Project (3GPP), Mobile Competence Centre, 650, Route Des Lucioles, F-06921 Sophia-Antipolis Cedex, France , Oct. 5, 2020 (Oct. 5, 2020), XP052300338, Retrieved from the Internet: U RL:https://ftp.3gpp.org/3gu Internal,40 pages.

International Search Report and Written Opinion regarding PCT/CN2020/122713 dated Jul. 8, 2021.

CATT, "Discussion on Dynamic PTM and PTP Switch with Service Continuity," *3GPP TSG-RAN W62 Meeting #111 electronic*, R2-2006594, Aug. 28, 2020.

Extended European Search Report regarding EP 20 95 8152 dated Aug. 3, 2023.

Huawei et al., "Dynamic switch between PTP 1-15 and PTM for MBS bearer," 3GPP Draft; R2-2007026, 3rd Generation Partnership Project (3GPP), Mobile Competence Centre, 650, Route Des Lucioles, F06921 Sophia-Antipolis Cedex, France, vol. RAN WG2, No. Electronic, Aug. 17, 2020-Aug. 28, 2020, August 7, 2020, XP052360145, Retrieved from the Internet: https://ftp.3gpp.org/tsg_ran/WG2_RL2/TSGR2_111-e/Docs/R2-2007026.zipR2-2007026.doc.

Ericsson, "Protocol structure and bearer modelling for NR MBS," 3GPP Draft, R2-2007631, 3rd Generation Partnership Project (3GPP), Mobile Competence Centre, 650, Route Des Lucioles, F-06921 Sophia-Antipolis Cedex, France, vol. RAN WG2, No. Electronic meeting, Aug. 17, 2020-Aug. 28, 2020, Aug. 6, 2020, XP052360746, Retrieved from the Internet: https://ftp.3gpp.org/tsg_ran/WG2_RL2/TSGR2_111-e/Docs/R2-2007631.zip R2-2007631Protocol structure and bearermodelling.docx.

Zte et al., "Delivery mode switching for NR MBS," 3GPP Draft, R2-2007443, 3rd Generation Partnership Project (3GPP), Mobile Competence Centre, 650, Route Des Lucioles, F-06921 Sophia-Antipolis Cedex, France, vol. RAN WG2, No. electronic, Aug. 17, 2020-Aug. 28, 2020, Aug. 7, 2020, XP051912188, Retrieved from the Internet: https://ftp.3gpp.org/tsg_ran/WG2_RL2/TSGR2_111-e/Docs/R2-2007443.zipR22007443Delivery mode switching for NR MBS.doc.

Vietnamese-language Office Action with English translation issued in Application No. 115733/SHTT-SC dated Aug. 8, 2025, (3 pages).

* cited by examiner receiving, by a second packet data convergence protocol (PDCP) entity at a second end of the group of second ends, the MBS data from a first PDCP entity at the first end

First end
510

Second end
550

PDCP 511

PDCP 551

RLC (PTM) 521

RLC (PTP) 523

RLC (PTM) 561

RLC (PTP) 563

MAC 531

MAC 571

600 receiving, by a second acknowledge mode (AM) point-to-multipoint (PTM) radio link control (RLC) entity at a second end of the group of the second ends, the MBS data from a first AM PTM RLC entity at the first end

1000 receiving, by a second end of the group of second ends, a piece of information sent from the first end, wherein the piece of information comprises at least one of the following: a first service identity indicating a MBS service or session in RAN, an indication on whether hybrid automatic repeat request (HARQ) feedback is enabled or disabled

METHODS AND DEVICES FOR ENHANCING MULTICAST AND BROADCAST SERVICES

CROSS-REFERENCE TO RELATED APPLICATION

This application is a continuation application of PCT International Patent Application No. PCT/CN2020/122713, filed with the China National Intellectual Property Administration, PRC on Oct. 22, 2020, which is herein incorporated by reference in its entirety.

TECHNICAL FIELD

The present disclosure is directed generally to wireless communications. Particularly, the present disclosure relates to methods and devices for enhancing multicast and broadcast services (MBS).

BACKGROUND

Wireless communication technologies are moving the world toward an increasingly connected and networked society. High-speed and low-latency wireless communications rely on efficient network resource management and allocation between user equipment and wireless access network nodes, including but not limited to radio access network (RAN). The RAN may communicate with one or more user equipment (UE) with a wireless radio bearer (RB) for multicast and broadcast services (MBS). The wireless radio bearer may be a point-to-point (PTP) or a point-to-multipoint (PTM) radio bearer. The present disclosure may address the issues and/or problems in re-transmitting packets for MBS in a packet data convergence protocol (PDCP) layer, a radio link control (RLC) layer, and/or a medium access control (MAC) layer.

SUMMARY

This document relates to methods, systems, and devices for wireless communication, and more specifically, for enhancing multicast and broadcast services (MBS).

In one embodiment, the present disclosure describes a method for wireless communication. The method includes receiving multicast and broadcast service (MBS) data by a group of second ends from a first end by: receiving, by a second packet data convergence protocol (PDCP) entity at a second end of the group of second ends, the MBS data from a first PDCP entity at the first end.

In another embodiment, the present disclosure describes a method for wireless communication. The method includes receiving multicast and broadcast service (MBS) data by a group of second ends from a first end by: receiving, by a second acknowledge mode (AM) point-to-multipoint (PTM) radio link control (RLC) entity at a second end of the group of the second ends, the MBS data from a first AM PTM RLC entity at the first end.

In another embodiment, the present disclosure describes a method for wireless communication. The method includes receiving multicast and broadcast service (MBS) data by a group of second ends from a first end by: receiving, by a second end of the group of second ends, a piece of information sent from the first end, wherein the piece of information comprises at least one of the following: a first service identity indicating a MBS service or session in RAN, an indication on whether hybrid automatic repeat request (HARQ) feedback is enabled or disabled.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 4 shows a flow diagram of a method for wireless communication.

FIG. 5A shows an exemplary schematic diagram of a method for wireless communication.

FIG. 6 shows a flow diagram of another method for wireless communication.

FIG. 10 shows a flow diagram of another method for wireless communication.

DETAILED DESCRIPTION

Figure 1A:
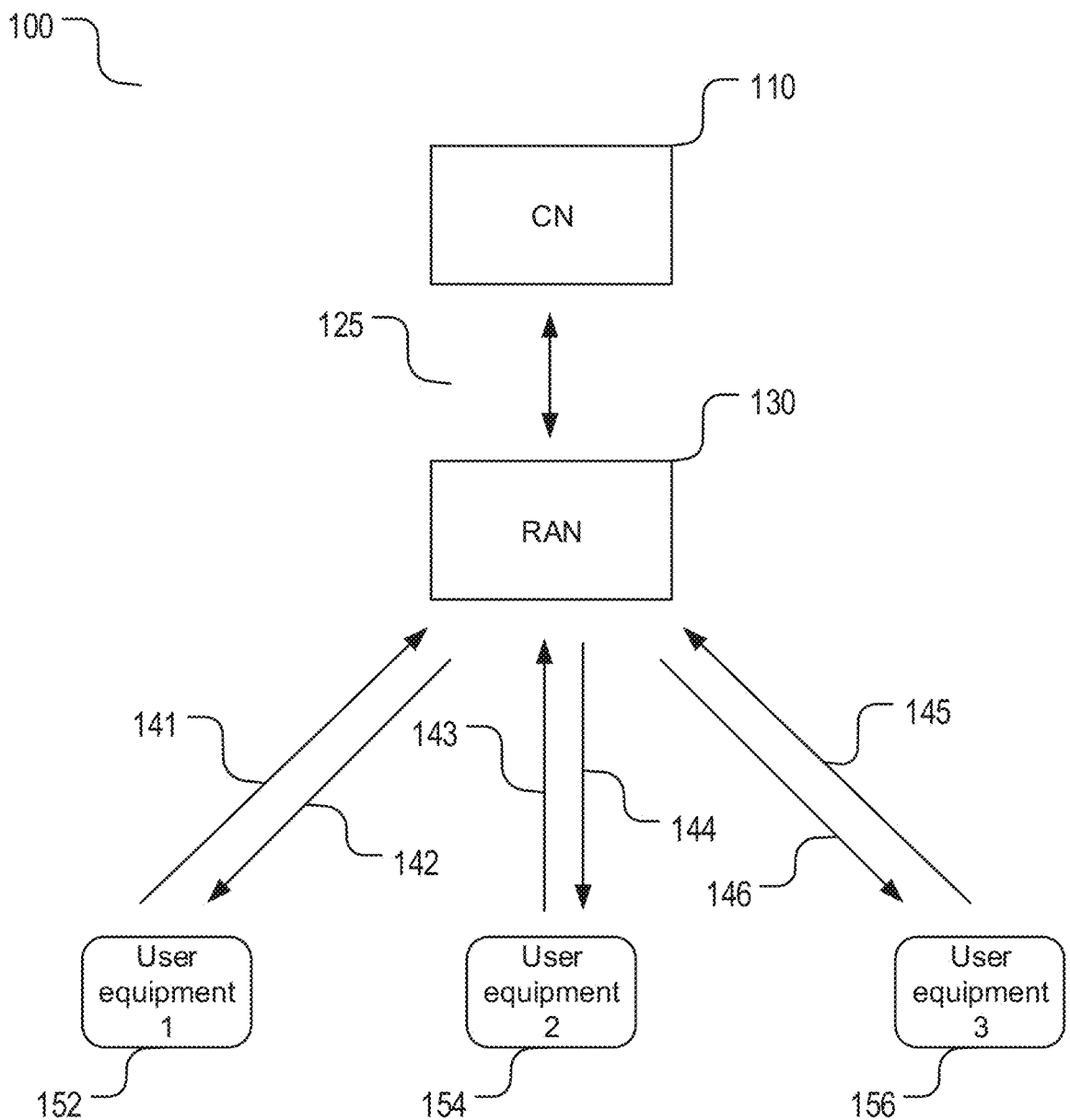
FIG. 1A shows an example of a point-to-point (PTP) radio bearer in a wireless communication system.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for enhancing multicast and broadcast services (MBS) including transmitting MBS data from a first end to a group of second ends.

Next generation (NG), or 5th generation (5G), wireless communication may provide a range of capabilities from downloading with fast speeds to support real-time low-latency communication. The wireless communication may use a radio bearer (RB) for multicast broadcast services (MBS). This range of capabilities may need some characteristics of quantity of service (QoS), such as delay, error rate, priority level, etc. In NG wireless communication, one or more service data flows with same QoS characteristics may be grouped together as a QoS flow. Each QoS flow may be identified by a QoS flow identifier, informing the network components the corresponding characteristics of the QoS flow.

Figure 1B:
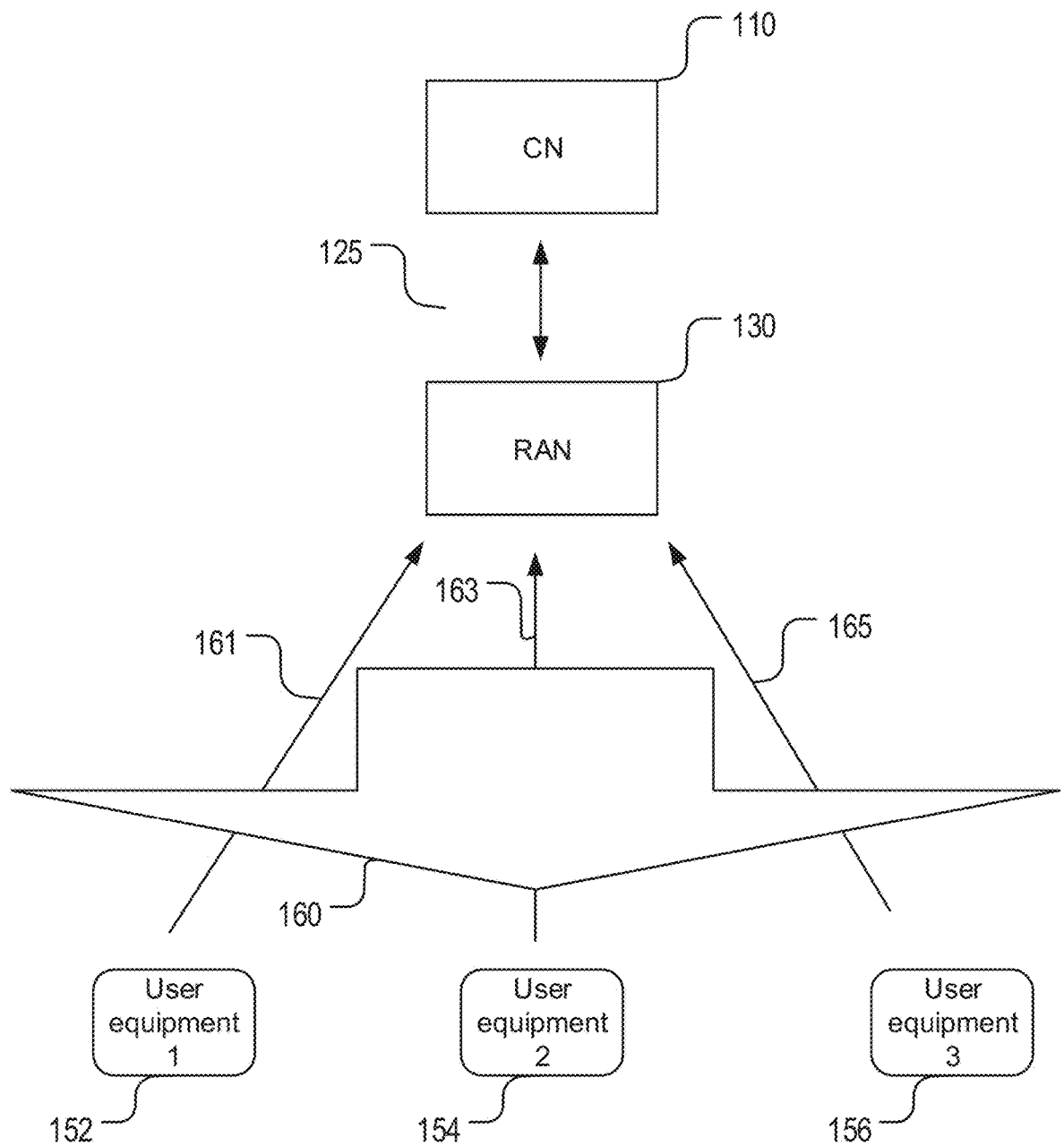
FIG. 1B shows an example of a point-to-multipoint (PTM) radio bearer in a wireless communication system.

FIGS. 1A and 1B show various transmission modes for a wireless communication system 100 including a core network (CN) 110, a radio access network (RAN) 130, and one or more user equipment (UE) (152, 154, and 156). The RAN 130 may include a wireless network base station, or a NG radio access network (NG-RAN) base station or node, which may include a nodeB (NB, e.g., a gNB) in a mobile telecommunications context. In one implementation, the core network 110 may include a 5G core network (5GC), and the interface 125 may include a NG interface. The RAN 130 (e.g., gNB) may include an architecture of separating a central unit (CU) and one or more distributed units (DUs).

The communication between the RAN and the one or more UE may include at least one radio bearer (RB) for multicast broadcast services (MBS). UEs may use two different cast modes for RB to receive MBS data. One cast mode may be point-to-point (PTP) or unicast, another cast mode may be point-to-multipoint (PTM) or multicast or broadcast. The PTP cast mode and unicast cast mod may refer to a same cast mode. A PTP RB may be a DRB, a PTM RB may be a multicast RB or a broadcast RB. FIG. 1A shows a PTP cast mode for the one or more UE for MBS; and FIG. 1B shows a PTM cast mode for the one or more UE for MBS.

Referring to FIG. 1A, a first UE 152 may wirelessly receive from the RAN 130 via a PTP RB 142 and wirelessly send communication to the RAN 130 via a uplink channel 141. Likewise, a second UE 154 may wirelessly receive communicate from the RAN 130 via a PTP RB 144 and wirelessly send communication to the RAN 130 via a uplink channel 143; and a third UE 156 may wirelessly receive communicate from the RAN 130 via a PTP RB 146 and wirelessly send communication to the RAN 130 via a uplink channel 145.

Referring to FIG. 1B, the RAN 130 may wirelessly communicate to one or more UEs (152, 154, and 156) via a PTM RB 160. In one implementation, the first UE 152 may wirelessly send communication to the RAN 130 via a uplink channel 161. Likewise, the second UE 154 may wirelessly send communication to the RAN 130 via a uplink channel 163; and the third UE 156 may wirelessly send communication to the RAN 130 via a uplink channel 165.

In the wireless communication system 100 in FIGS. 1A and 1B, the RAN 130 may select which cast mode one UE uses for MBS, in order to improve high efficiency of the wireless network. The cast mode selection may depends on various types of information, for example but not limited to, a load condition for MBS, a working status of UE in a PTP cast mode or a PTM cast mode, or a cast mode interest indication of the UE.

There are some problems associated with how to transmit MBS data from a first end, e.g., a base station, to a second end or a group of second ends, e.g, UE/UEs. There are some problems/issues associated with how to re-transmit packets for MBS in a packet data convergence protocol (PDCP) layer, a radio link control (RLC) layer, and/or a medium access control (MAC) layer.

The present disclosure describes embodiments of methods and devices for enhancing multicast and broadcast services (MBS) including transmitting MBS data from a first end to a group of second ends, addressing at least one of the problems/issues discussed above.

Figure 2:
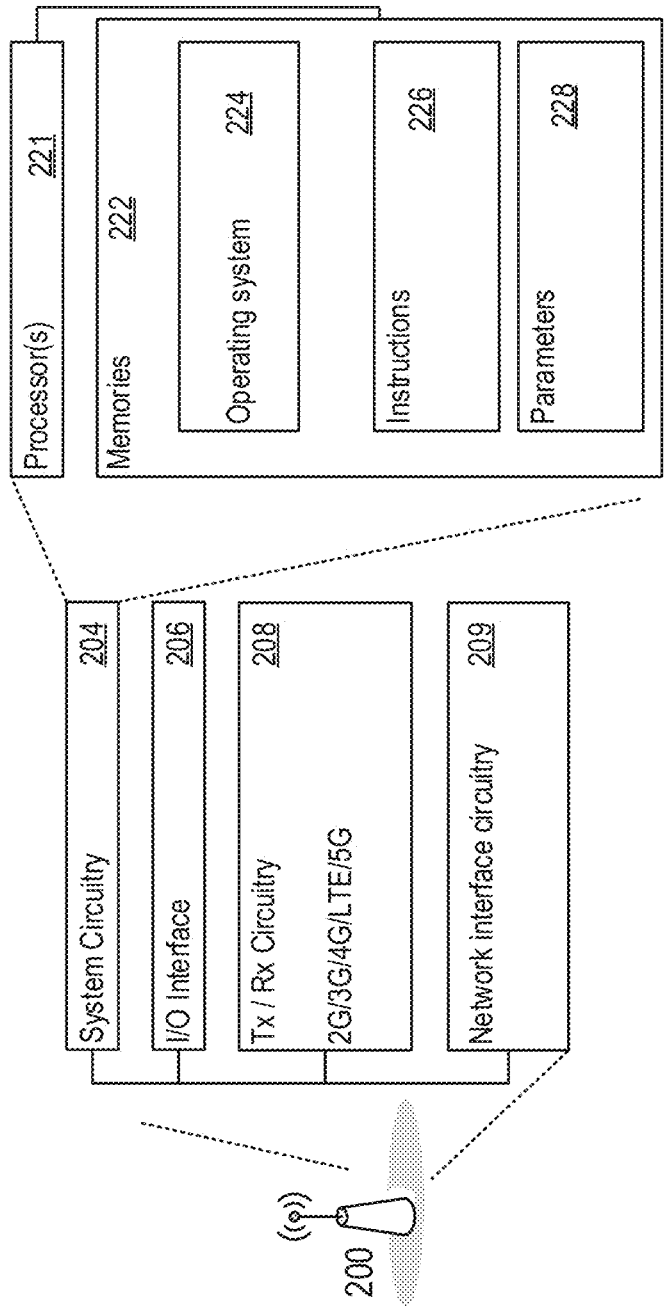
FIG. 2 shows an example of a wireless network node.

FIG. 2 shows an exemplary a radio access network or a wireless communication base station 200. The base station 200 may include radio transmitting/receiving (Tx/Rx) circuitry 208 to transmit/receive communication with one or more UEs, and/or one or more other base stations. The base station may also include network interface circuitry 209 to communicate the base station with other base stations and/or a core network, e.g., optical or wireline interconnects, Ethernet, and/or other data transmission mediums/protocols. The base station 200 may optionally include an input/output (I/O) interface 206 to communicate with an operator or the like.

The base station may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the base station. The parameters 228 may include parameters to support execution of the instructions 226. For example, parameters may include network protocol settings, bandwidth parameters, radio frequency mapping assignments, and/or other parameters.

Figure 3:
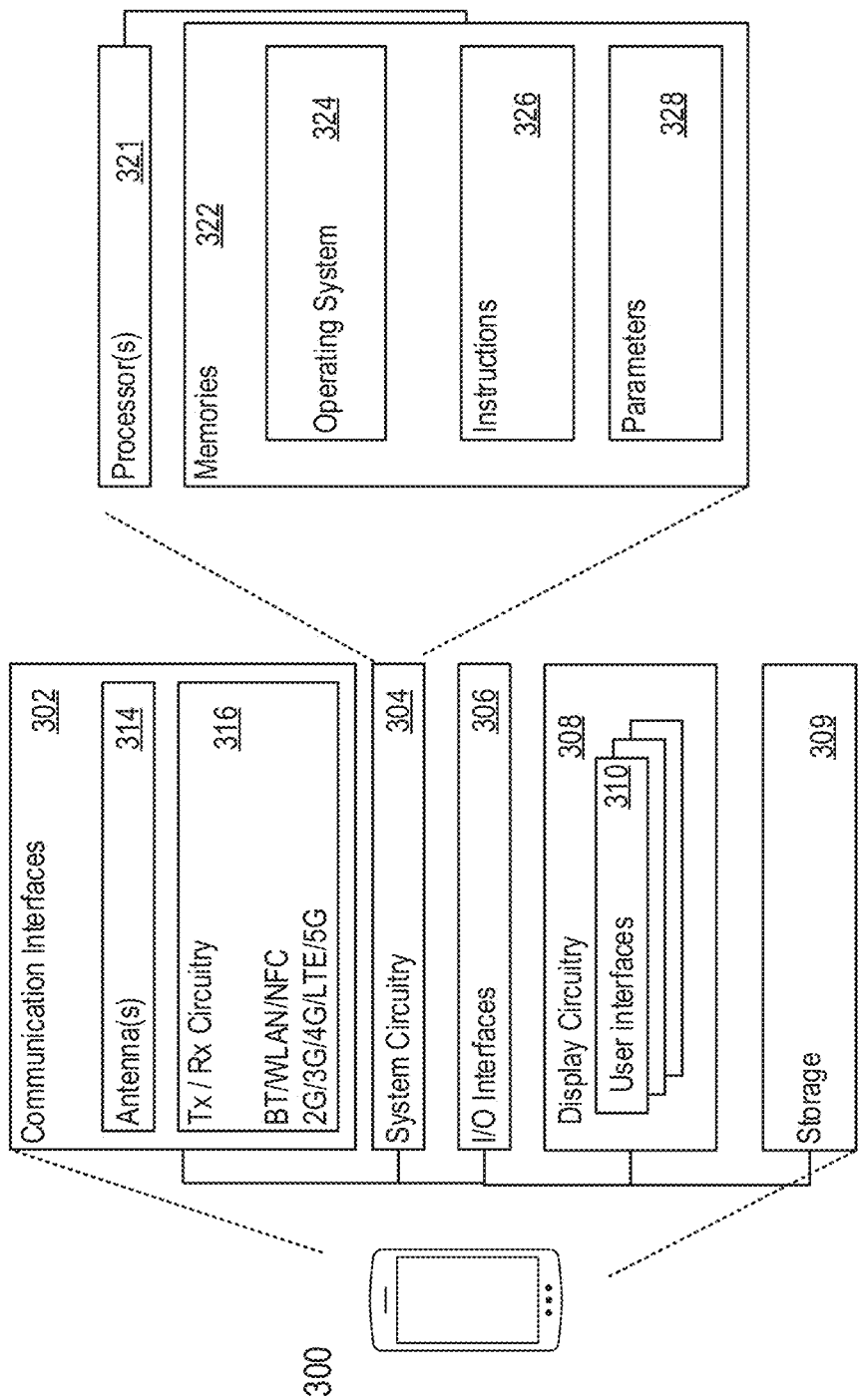
FIG. 3 shows an example of a user equipment.

FIG. 3 shows an exemplary user equipment (UE) 300. The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, preamplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several embodiments of methods and devices for enhancing multicast and broadcast services (MBS) including transmitting MBS data from a first end to a group of second ends, which may be implemented, partly or totally, on the wireless network base station and/or the user equipment described above in FIGS. 2 and 3.

In one embodiment, referring to FIG. 4, a method 400 for wireless communication includes receiving multicast and broadcast service (MBS) data by a group of second ends from a first end. The method 400 may include step 410: receiving, by a second packet data convergence protocol (PDCP) entity at a second end of the group of second ends, the MBS data from a first PDCP entity at the first end.

In one implementation, the first PDCP entity is associated with at least one of the following: a first point-to-multipoint (PTM) radio link control (RLC) entity for transmitting the MBS data via a PTM way, and a first point-to-point (PTP) RLC entity for a data transmission or reception via a PTP way.

In another implementation, the second PDCP entity is associated with at least one of the following: a second PTM RLC entity for receiving the MBS data via a PTM way, and a second PTP RLC entity used for receiving the MBS data from the first end and reporting or transmitting MBS feedback to the first end via a PTP way; and the MBS data comprises at least one of the following: MBS traffic data, or a control protocol data unit (PDU) for MBS.

In another implementation, the first end comprises at last one of the following: a base station, a radio access network (RAN) node, or a next-generation RAN (NG-RAN); and the second end comprises a user equipment (UE).

In another implementation, the first PDCP entity delivers a PDCP protocol data unit (PDU) to an associated first PTM RLC entity for a PTM transmission.

Figure 5B:
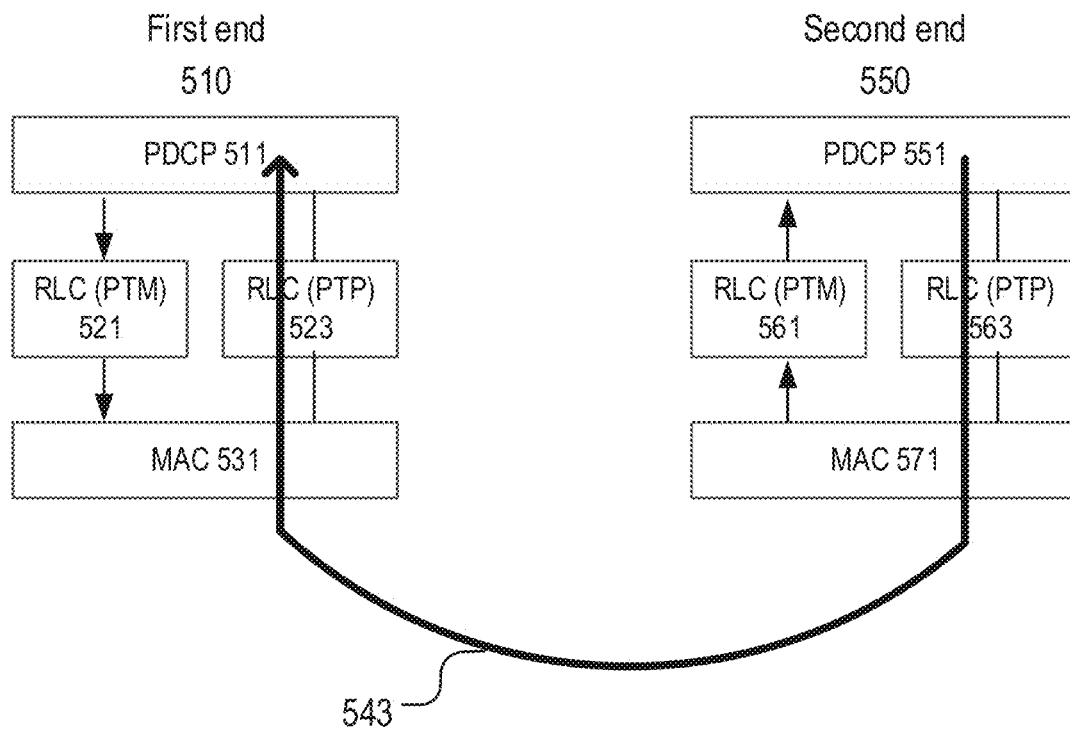
FIG. 5B shows an exemplary schematic diagram of a method for wireless communication.
Figure 5C:
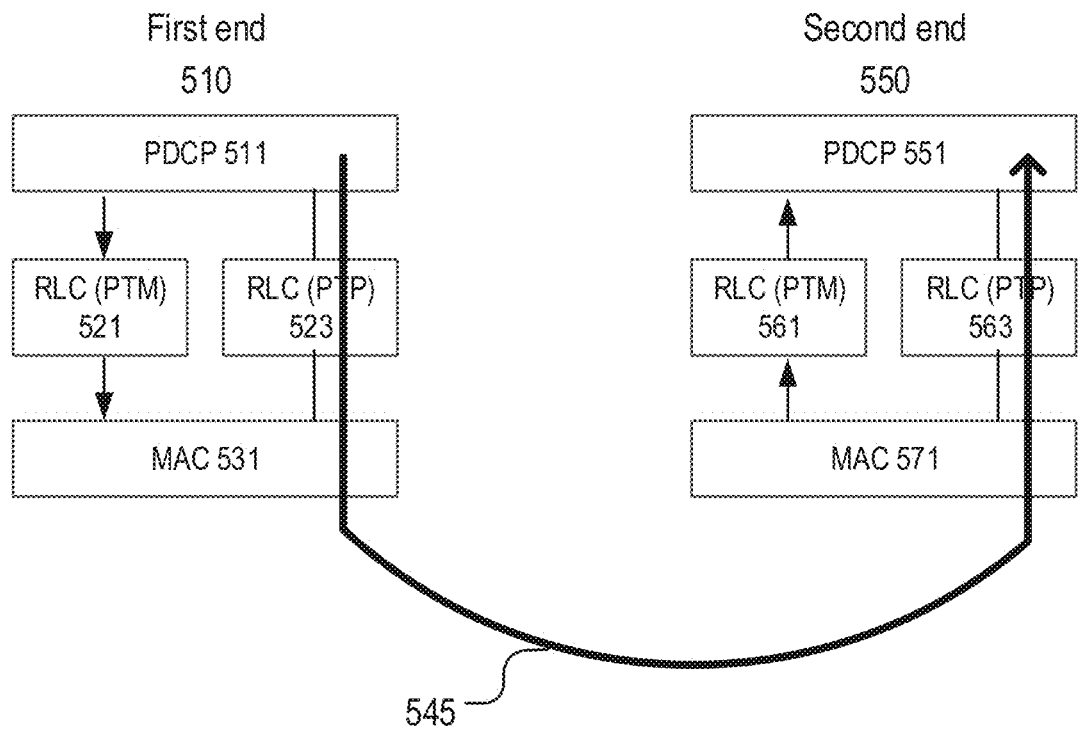
FIG. 5C shows an exemplary schematic diagram of a method for wireless communication.

For one example of the embodiments in FIGS. 5A, 5B, and 5C, a first end 510 may be a base station, a RAN node, or a NG-RAN node, and a second end 550 may be a UE, a bearer for transmitting MBS traffic/data is called an MBS bearer.

The first end 510 may include a PDCP 511, which may be referred as the first PDCP entity. The PDCP 511 may be associated with an RLC (PTM) 521, which may be referred as the associated PTM RLC entity, and an RLC (PTP) 523, which may be referred as the associated PTP RLC entity. The first end may include a MAC 531.

The second end 550 may include a PDCP 551, which may be referred as the second PDCP entity. The PDCP 551 may be associated with an RLC (PTM) 561, which may be referred as the associated PTM RLC entity, and an RLC (PTP) 563, which may be referred as the associated PTP RLC entity. The second end may include a MAC 571.

Referring to FIG. 5A, a first transmission 541 may be performed from the PDCP 511, the RLC (PTM) 521, and the MAC 531 of the first end 510, via wireless transmission, to the MAC 571, the RLC (PTM) 561, and the PDCP 551 of the second end 550. The PDCP entity at the first end is called as the first PDCP entity, the PDCP entity at the second end is called as the second PDCP entity.

Referring to FIG. 5B, a transmission of acknowledgement 543 may be performed from the PDCP 551, the RLC (PTP) 563, and the MAC 571 of the second end 550, via wireless transmission, to the MAC 531, the RLC (PTP) 523, and the PDCP 511 of the first end 510. In one implementation, the transmission of acknowledgement may indicate one PDU needs to be re-transmitted.

Referring to FIG. 5C, a re-transmission 545 of one or more PDU may be performed from the PDCP 511, the RLC (PTP) 523, and the MAC 531 of the first end 510, via wireless transmission, to the MAC 571, the RLC (PTP) 563, and the PDCP 551 of the second end 550.

In one implementation, the first PDCP entity is associated with one PTM RLC entity for transmitting MBS data to a group of second ends, and/or one PTP RLC entity for each group member (i.e., second end) in order to transmitting MBS data (e.g., MBS traffic data, control PDU for MBS) between that group member and the first end.

In another implementation, for the first PDCP entity of MBS bearer, it delivers a PDCP PDU to the associated PTM RLC entity for PTM transmission or the associated PTP RLC entity for PTP transmission/reception.

For one example as shown in FIG. 5A, when the PDCP PDU is a first transmission (i.e., the PDCP PDU is delivered to lower layers for the first time), the first PDCP entity delivers the PDCP PDU to the associated PTM RLC entity.

For another example as shown in FIG. 5C, when the PDCP PDU is for re-transmission to a specific group member (i.e., second end), the first PDCP entity delivers the PDCP PDU to the associated PTP RLC entity.

In another implementation, the second PDCP entity receives a PDCP PDU from at least one lower layer; the second PDCP entity submits a PDCP PDU to the associated second PTP RLC entity; and wherein at least one lower layer comprises at least one of the following: the associated second PTP RLC entity, the associated second PTM RLC entity, one or more of all RLC entities associated to the second PDCP entity. The PDCP PDU may include a PDCP status report, and/or a PDCP control PDU.

In another implementation, the second PDCP entity comprises a first timer for at least one of the following: detecting a loss of at least one PDCP PDU, or triggering a PDCP status report.

In another implementation, the first timer comprises a shorter cycle time than a second timer for detecting a loss of at least one PDCP PDU.

In another implementation, the second PDCP entity comprises a first state variable, wherein the first state variable comprises a count value following the count value associated with the PDCP PDU triggering the first timer.

In another implementation, for a MBS bearer, the second PDCP entity triggers a PDCP status report upon at least one of the following conditions: an upper layer requests a PDCP entity re-establishment or a PDCP data recovery; the first timer expires; a reception of a poll notification from its peer entity where the poll notification is a PDCP control PDU from the first end; or a mode switches between a PTP mode and a PTM mode.

In another implementation, upon the received PDCP PDU with a count value comprising a received count being not discarded, the second PDCP entity perform at least one of the following: upon the first timer being running and a delivery-state variable being no smaller than the received count, stopping and resetting the first timer; upon the first timer being not running and the delivery-state variable being smaller than a next-state variable, updating a first state variable to the next-state variable, and starting the first timer, and wherein the delivery-state variable indicates a count value of a first PDCP SDU not delivered to a upper layer but still waited for, and the next-state variable indicates a count value of the next PDCP SDU expected to be received.

In another implementation, upon the second timer expiring and a delivery-state variable being smaller than a next-state variable, the second PDCP entity perform the following: updating a reord-state variable to the next-state variable, wherein the reord-state variable indicates a count value following a count value associated with the PDCP PDU triggering the second timer; starting the second timer; updating a first state variable to the next-state variable; and starting the first timer.

In another implementation, upon the first timer expiring, the second PDCP entity perform the following: triggering a PDCP status report; and upon a delivery-state variable being smaller than a next-state variable, updating a first state variable to the next-state variable, and starting the first timer.

In another implementation, upon the first timer being reconfigured by an upper layer while the first timer is running, the second PDCP entity perform the following: updating a first state variable to a next-state variable; and stopping and restarting the first timer.

For another example of the embodiments, for MBS bearers, each second PDCP entity may be associated with one PTM RLC entity, and/or one PTP RLC entity, as shown in FIG. 5A. In one implementation, the PTM RLC entity may be used for receiving MBS data via a PTM way. In another implementation, the PTP RLC entity may be used for receiving MBS data (e.g., MBS traffic data, control PDU for MBS) from the first end and optionally reporting/transmitting MBS feedback (e.g., control PDU for MBS) to the first end via a PTP way.

In another implementation, for the second PDCP entity of MBS bearer, it receives a PDCP PDU from lower layers, or from associated PTP RLC entity and/or PTM RLC entity, or from all RLC entities associated to this PDCP entity. In another implementation, when submitting a PDCP PDU to lower layer, the second PDCP entity submits the PDCP PDU to the associated PTP RLC entity, wherein the PDCP PDU may include a PDCP status report and/or a PDCP control PDU.

In another implementation, the second PDCP entity may send a PDCP status report to the first node to indicate the second PDCP entity of the status of receiving PDCP SN.

In another implementation, the second PDCP entity for MBS maintains a first timer. The first timer is used for detecting loss of PDCP Data PDUs and/or triggering a PDCP status report. If the first timer is running, the first timer may not be started additionally, i.e., only one first timer per PDCP entity is running at a given time. Optionally in another implementation, the first timer is smaller than another timer, which may be referred as a second timer, or as "t-Reordering" and is used to detect loss of one or more PDCP Data PDUs.

In another implementation, the second PDCP entity for MBS maintains a first_state_variable. This state variable holds the value of the COUNT value following the COUNT value associated with the PDCP Data PDU which triggered the first timer.

In another implementation, MBS bearers may include acknowledge mode (AM) MBS bearers, and/or un-acknowledge mode (UM) MBS bearers. For MBS bearers configured by upper layers to send a PDCP status report via the PTP RLC entity, PTP RLC path, or PTP RLC leg, the second PDCP entity may trigger a PDCP status report when at least one of the following occurs: upper layer requests a PDCP entity re-establishment or a PDCP data recovery, the first timer expires, upon reception of a poll notification from its peer entity, upon a mode switch between PTP mode and PTM mode.

In another implementation, for MBS bearers, the second PDCP entity may trigger a PDCP status report when at least one of the following occurs: upper layer requests a PDCP entity re-establishment or a PDCP data recovery, the first timer expires, upon reception of a poll notification from its peer entity, upon a mode switch between PTP mode and PTM mode.

In another implementation, when the received PDCP Data PDU with COUNT value=RCVD_COUNT is not discarded, the second PDCP entity may perform at least one of the following steps.

Optionally and/or alternatively, one step may include storing the resulting PDCP SDU in the reception buffer.

Optionally and/or alternatively, another step may include, when RCVD_COUNT>=RX_NEXT, updating RX_NEXT to RCVD_COUNT+1.

Optionally and/or alternatively, another step may include, when outOfOrderDelivery is configured, delivering the resulting PDCP SDU to upper layers.

Optionally and/or alternatively, another step may include, when RCVD_COUNT=RX_DELIV, delivering to upper layers in ascending order of the associated COUNT value after performing header decompression; if not decompressed before, all stored PDCP SDU(s) with consecutively associated COUNT value(s) starting from COUNT=RX_DELIV; and updating RX_DELIV to the COUNT value of the first PDCP SDU which has not been delivered to upper layers, with COUNT value>RX_DELIV.

Optionally and/or alternatively, another step may include, when t-Reordering is running and when RX_DELIV>=RX_REORD, stopping and resetting t-Reordering.

Optionally and/or alternatively, another step may include, when t-Reordering is not running (includes the case when t-Reordering is stopped due to actions above) and RX_DELIV<RX_NEXT, updating RX_REORD to RX_NEXT, and/or starting t-Reordering.

Optionally and/or alternatively, another step may include, when the first timer is running and RX_DELIV>=first_state_variable, stopping and resetting the first timer.

Optionally and/or alternatively, another step may include, when the first timer is not running (includes the case when the first timer is stopped due to actions above) and RX_DELIV<RX_NEXT, updating first_state_variable to RX_NEXT, and/or starting the first timer.

In another implementation, the RX_NEXT may be one state variable indicating the COUNT value of the next PDCP SDU expected to be received. For MBS bearer, the initial value of the SN part of RX_NEXT may be (x+1) modulo $(2^{[sl\text{-}PDCP\text{-}SN\text{-}Size]})$, where x is the SN of the first received PDCP Data PDU.

In another implementation, the RX_DELIV may be one state variable indicating the COUNT value of the first PDCP SDU not delivered to the upper layers, but still waited for. For MBS bearer, the initial value of the SN part of RX_DELIV is $(x-0.5\times 2^{[sl\text{-}PDCP\text{-}SN\text{-}Size\text{-}1]})$ modulo $(2^{[sl\text{-}PDCP\text{-}SN\text{-}Size]})$, where x is the SN of the first received PDCP Data PDU.

In another implementation, when t-Reordering expires, the second PDCP entity may perform at least one of the following steps.

Optionally and/or alternatively, one step may include delivering to upper layers in ascending order of the associated COUNT value after performing header decompression, if not decompressed before all stored PDCP SDU(s) with associated COUNT value(s)<RX_REORD, or all stored PDCP SDU(s) with consecutively associated COUNT value(s) starting from RX_REORD.

Optionally and/or alternatively, another step may include updating RX_DELIV to the COUNT value of the first PDCP SDU which has not been delivered to upper layers, with COUNT value>=RX_REORD.

Optionally and/or alternatively, another step may include, when RX_DELIV<RX_NEXT, updating RX_REORD to RX_NEXT, starting the t-Reordering, updating first_state_variable to RX_NEXT, and/or starting the first timer.

In another implementation, when the first timer expires, the second PDCP entity may perform one of the following steps.

Optionally and/or alternatively, one step may include triggering a PDCP status report.

Optionally and/or alternatively, one step may include, when RX_DELIV<RX_NEXT, updating first_state_variable to RX_NEXT, and/or starting the first timer.

In another implementation, when the value of the first timer is reconfigured by upper layers while the first timer is running, the second PDCP entity may perform updating first_state_variable to RX_NEXT, and/or stopping and restarting the first timer.

In another implementation of the embodiments, the second end receives a first information from the first end, wherein the first information comprises at least one of the following information for a MBS bearer identified by a MBS bearer ID: a first PDCP configuration, a first RLC bearer configuration, or a second RLC bearer configuration.

In another implementation, the first PDCP configuration is used to set configurable PDCP parameters for the MBS bearer; and the first PDCP configuration comprises at least one of the following: a temporal mobile group identity (TMGI) or an identity of a MBS service or session, a MBS bearer ID identifying a radio bearer for MBS, a first indication indicating a cell group ID or LCID of a PTP RLC entity, a second indication indicating the cell group ID or LCID of a PTM RLC entity, a third indication indicating whether the MBS bearer is configured to send a PDCP status report in an uplink via a PTP RLC path, or a first timer whose value is a period for triggering a PDCP status report.

In another implementation, when a PDCP status report is triggered, the second PDCP entity sends a PDCP status report in response that the third indication indicating the MBS bearer is configured to send a PDCP status report in an uplink via the PTP RLC path.

For another example of the embodiments, the first end may send a first information to a second end, the first information may include at least one of the following information for a MBS bearer identified by a MBS bearer ID: a first PDCP configuration, a first RLC bearer configuration, and/or a second RLC bearer configuration.

In one implementation, the first PDCP configuration is used to set the configurable PDCP parameters for a MBS bearer. The first PDCP configuration includes at least one of the following information: a temporal mobile group identity (TMGI) or an identity of a MBS service/session, a MBS bearer ID identifying the radio bearer for MBS, a first indication indicating the cell group ID and/or LCID of the PTP RLC entity, a second indication indicating the cell group ID and/or LCID of the PTM RLC entity, the third indication indicating whether the MBS bearer is configured to send a PDCP status report in the uplink via the PTP RLC entity/path/leg, a first timer whose value is the period for triggering a PDCP status report.

In another implementation, the first timer may be a value in a set. The set may include {ms0, ms1, ms2, ms4, ms5, ms8, ms10, ms15, ms20, ms30, ms40, ms50, ms60, ms80, ms100, ms120, ms140, ms160, ms180, ms200, ms220, ms240, ms260, ms280, ms300, ms500, ms750, ms1000, ms1250, ms1500, ms1750, ms2000, ms2250, ms2500, ms2750, ms3000, spare28, spare27, spare26, spare25, spare24, spare23, spare22, spare21, spare20, spare19, spare18, spare17, spare16, spare15, spare14, spare13, spare12, spare11, spare10, spare09, spare08, spare07, spare06, spare05, spare04, spare03, spare02, spare01}. The value of ms0 corresponds to 0 millisecond (ms), the value of ms20 corresponds to 20 ms, the value of ms40 corresponds to 40 ms, and so on. In another implementation, when the field is absent, the UE may apply the value infinity.

In another embodiment, referring to FIG. 6, a method 600 for wireless communication includes receiving multicast and broadcast service (MBS) data by a group of second ends from a first end. The method 600 may include step 610: receiving, by a second acknowledge mode (AM) point-to-multipoint (PTM) radio link control (RLC) entity at a second end of the group of the second ends, the MBS data from a first AM PTM RLC entity at the first end.

Figure 7:
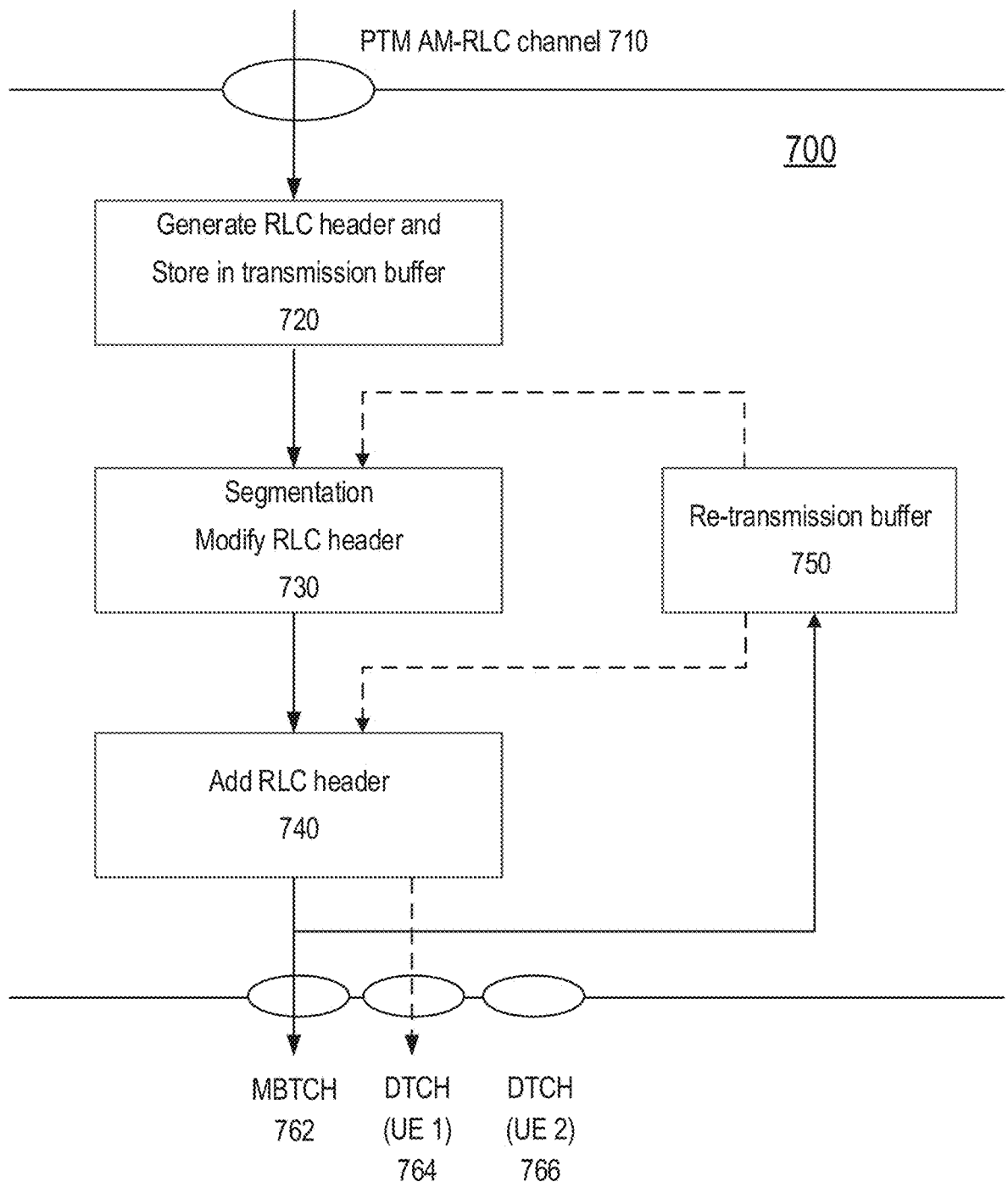
FIG. 7 shows an exemplary schematic diagram of a first end for wireless communication.

FIG. 7 shows an exemplary schematic diagram of an AM PTM RLC entity 700 at a first end, for example, at a gNB. The AM PTM RLC entity 700 may include a portion or all of the following: a PTM AM-RLC channel 710, a sub-entity 720 to generate RLC header and store data in transmission buffer, a sub-entity 730 for segmentation and to modify RLC header, a sub-entity 740 to add RLC header, and/or a sub-entity 750 of re-transmission buffer. The AM PTM RLC entity 700 may include a multicast and broadcast traffic channel (MBTCH) 762, and one or more dedicated traffic channel (DTCH), for example but not limited to, a first DTCH 764 for UE 1, and a second DTCH 766 for UE 2.

Figure 8:
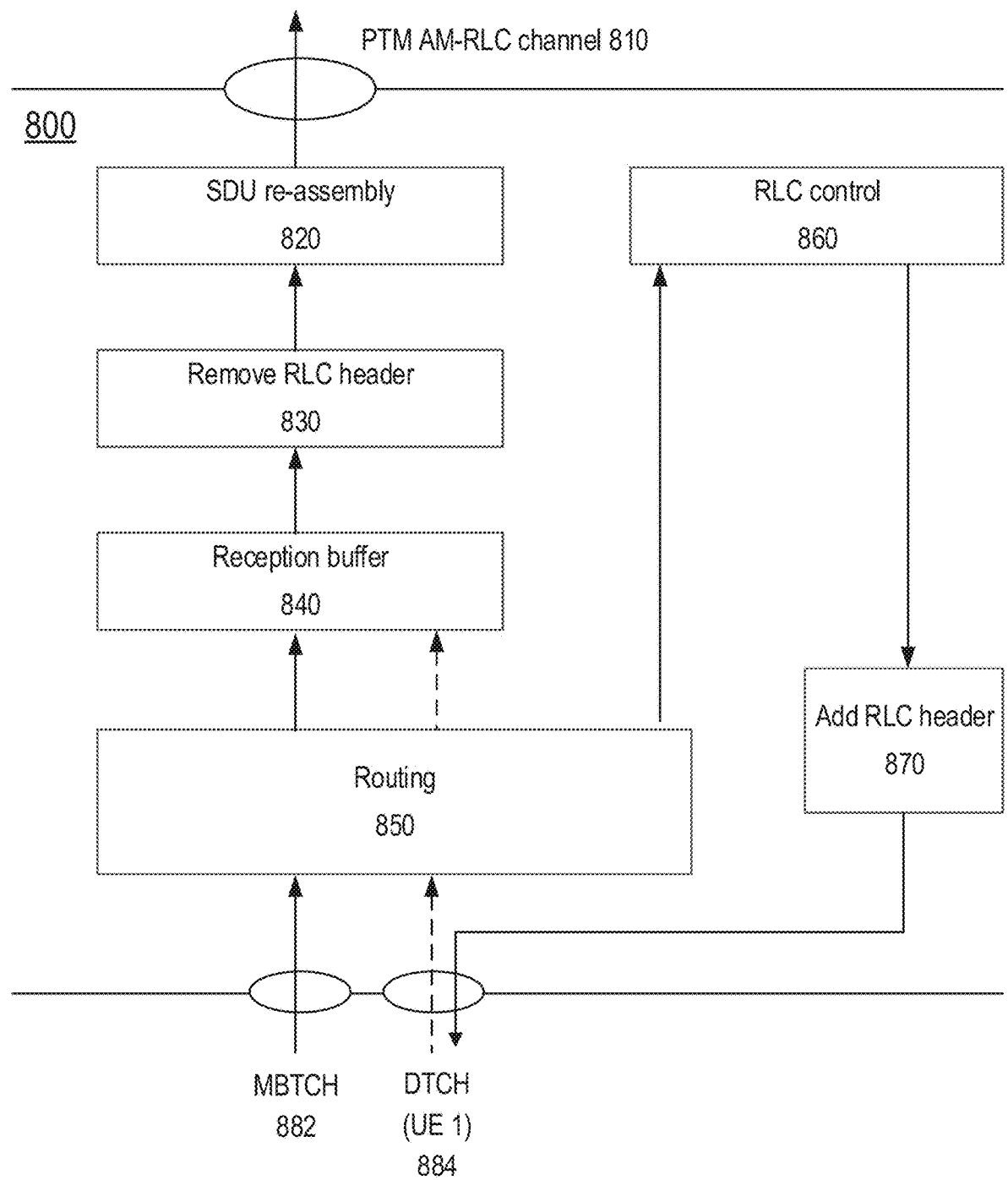
FIG. 8 shows an exemplary schematic diagram of a second end for wireless communication.

FIG. 8 shows an exemplary schematic diagram of an AM PTM RLC entity 800 at a second end, for example, at a UE 1. The AM PTM RLC entity 800 may include a portion or all of the following: a PTM AM-RLC channel 810, a sub-entity 820 for SDU reassembly, a sub-entity 830 to remove RLC header, a sub-entity 840 for reception buffer, a sub-entity 850 for routing, a sub-entity 860 for RLC control, and/or a sub-entity 870 to add RLC header. The AM PTM RLC entity 800 may include a multicast and broadcast traffic channel (MBTCH) 882, and a dedicated traffic channel (DTCH) 884 for UE 1.

In the present disclosure, an AM PTM RLC Entity may be also called as the AM mode PTM RLC entity, the PTM AM RLC Entity, or the AM mode of RLC entity for MBS. An UM PTM RLC Entity may be also called as the UM mode PTM RLC entity, PTM UM RLC Entity, or the UM mode of RLC entity for MBS.

In one implementation, an AM PTM RLC Entity may be associated with two kinds of logical channel: the first logical channel, and the second logical channel. The first logical channel is a logical channel for PTM. The second logical channel is a logical channel for PTP. The first logical channel may be a MBTCH. The second logical channel may be a DTCH.

In another implementation, the second AM PTM RLC entity at the second end is associated with a first logical channel for PTM reception and a second logical channel used for automatic repeat request (ARQ) feedback transmission and data reception via a point-to-point (PTP) way.

In another implementation, the first AM PTM RLC entity at the first end is associated with a first logical channel for PTM transmission and a group of second logic channels for PTP transmission and reception.

In another implementation, the first logical channel comprises a multicast and broadcast traffic channel (MBTCH); and the second logic channel comprises a dedicated traffic channel (DTCH).

In another implementation, the second AM PTM RLC entity at the second end submits an RLC PDU to a lower layer through the second logical channel of the second AM PTM RLC entity.

In another implementation, the second AM PTM RLC entity at the second end receives an AM mode data (AMD) PDU with at least one of the following ways: from a lower layer, from the first logical channel of the second AM PTM RLC entity, from the second logical channel of the second AM PTM RLC entity, from the first and second logical channels of the second AM PTM RLC entity, or from all logical channels associated to the second AM PTM RLC entity.

In another implementation, after receiving an AMD PDU, the second AM PTM RLC entity at the second end performs receiving operations in a same way as an AM PTP RLC entity does.

In another implementation, in response to a status reporting being triggered, a status PDU is transmitted to the first end via the second logical channel of the second AM PTM RLC entity at the second end.

In another implementation, for the second AM PTM RLC entity at the second end, at least one of the following: a RX_Next, a RX_Highest_Status, or a RX_Next_Highest, is initially set to a sequence number (SN) of at least one of the following: a first received RLC PDU, a first received RLC SDU, or a first received AMD PDU.

Figure 9A:
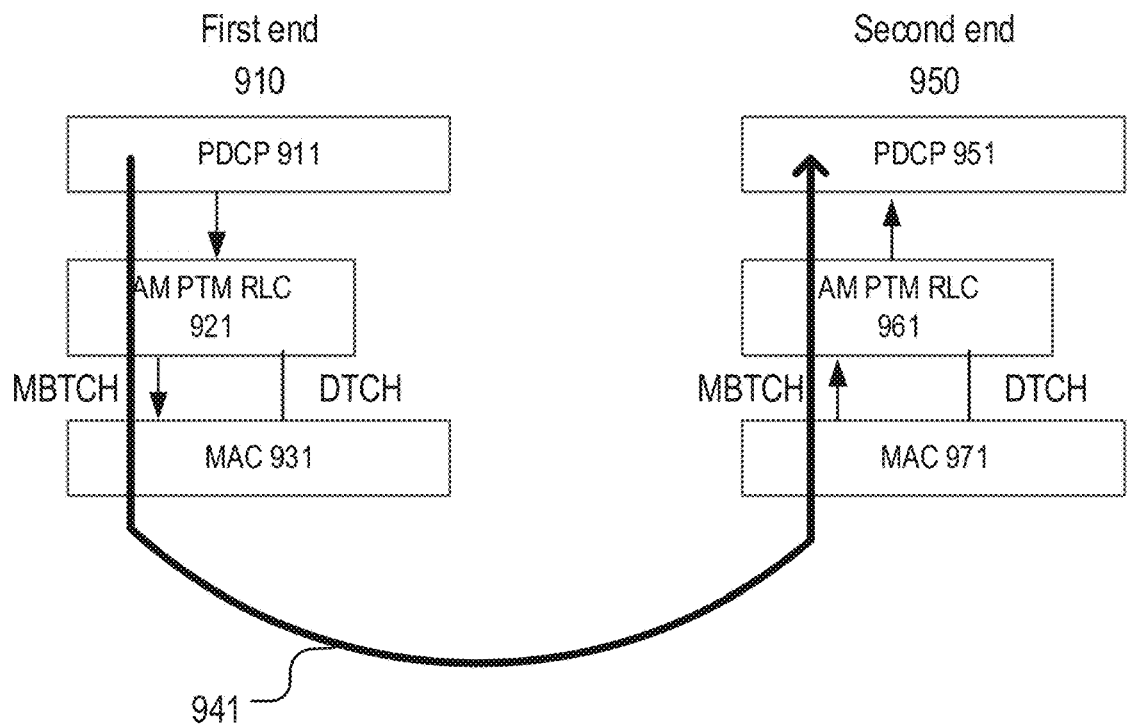
FIG. 9A shows an exemplary schematic diagram of a method for wireless communication.
Figure 9B:
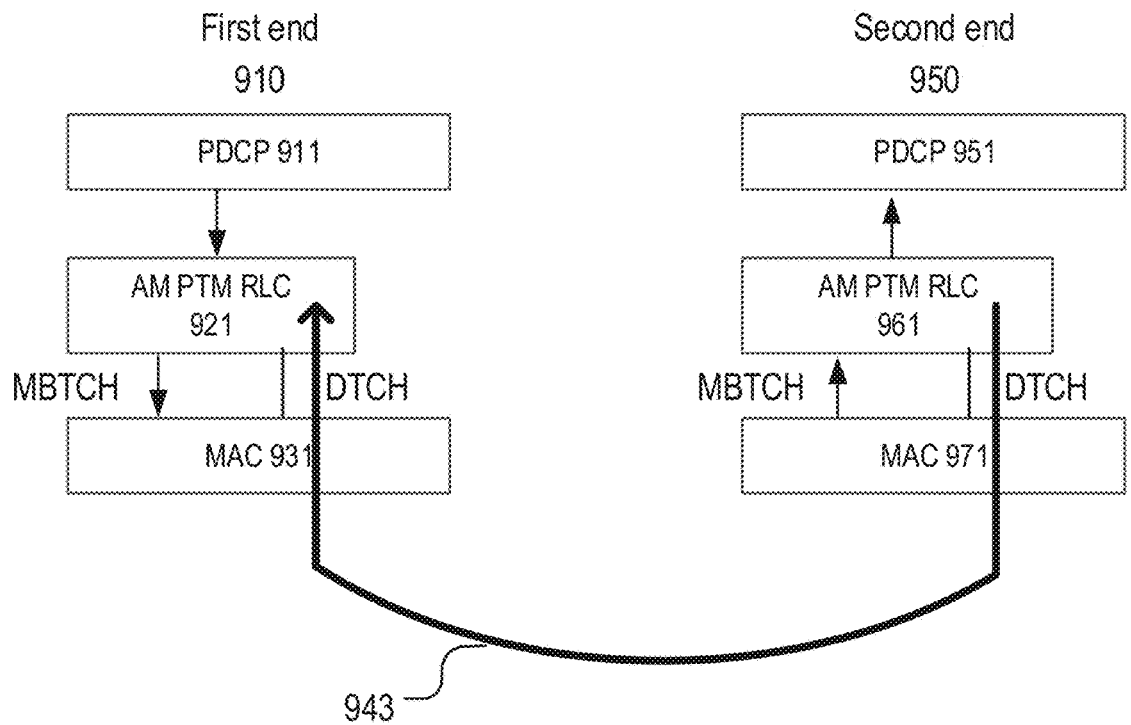
FIG. 9B shows an exemplary schematic diagram of a method for wireless communication.
Figure 9C:
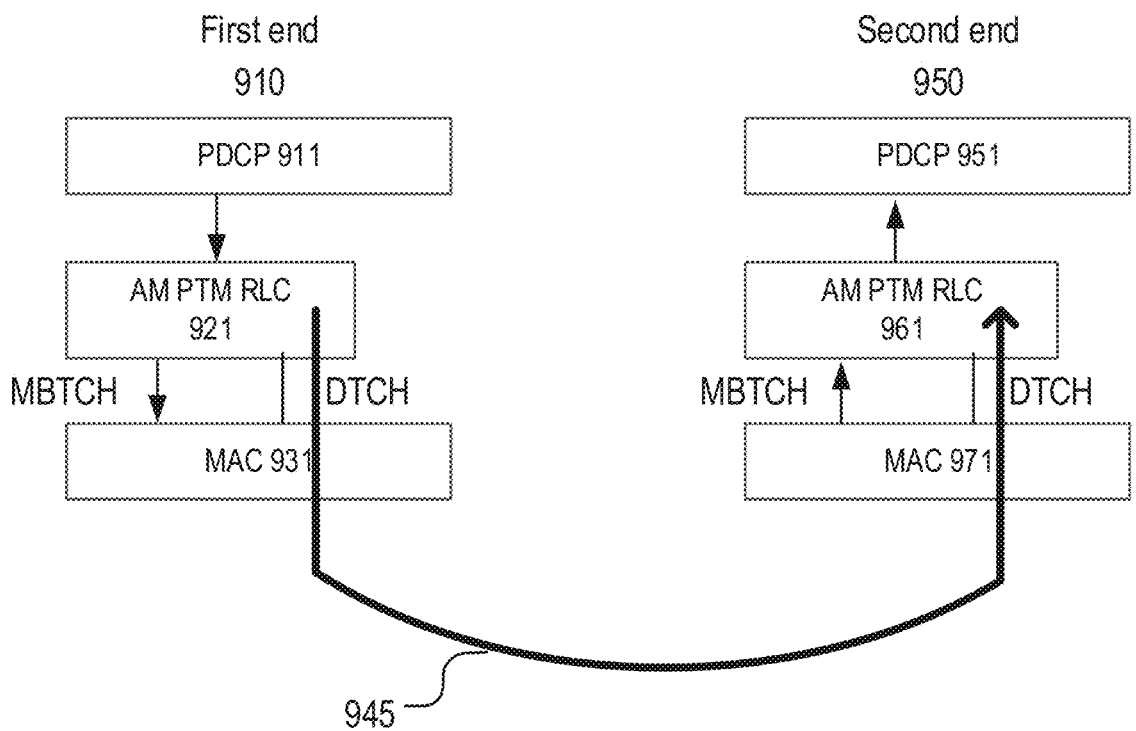
FIG. 9C shows an exemplary schematic diagram of a method for wireless communication.

For one example of the embodiments in FIGS. 9A, 9B, and 9C, a first end 910 may be a base station, a RAN node, or a NG-RAN node, and a second end 950 may be a UE.

The first end 910 may include a PDCP 911, which may be referred as the first PDCP entity. The PDCP 911 may be associated with an AM PTM RLC entity 921, which may be referred as the associated PTM RLC entity or the first AM PTM RLC entity. The first end may include a MAC 931.

The second end 950 may include a PDCP 951, which may be referred as the second PDCP entity. The PDCP 951 may be associated with an AM PTM RLC entity 961, which may be referred as the associated PTM RLC entity or the second AM PTM RLC entity. The second end may include a MAC 971.

Referring to FIG. 9A, a first transmission 941 may be performed from the PDCP 911, the AM PTM RLC entity 921 via MBTCH, and the MAC 931 of the first end 910, via wireless transmission, to the MAC 971, the AM PTM RLC entity 961 via MBTCH, and the PDCP 951 of the second end 950. The PDCP entity at the first end is called as the first PDCP entity, the PDCP entity at the second end is called as the second PDCP entity.

Referring to FIG. 9B, a transmission of acknowledgement 943 may be performed from the AM PTM RLC entity 961 via DTCH, and the MAC 971 of the second end 950, via wireless transmission, to the MAC 931 and the AM PTM RLC entity 921 via DTCH of the first end 910. In one implementation, the transmission of acknowledgement may indicate one PDU needs to be re-transmitted.

For a re-transmission, at least two implementation may be performed. In one implementation referring to FIG. 9C, a re-transmission 945 of one or more PDU may be performed from the AM PTM RLC entity 921 via DTCH, and the MAC 931 of the first end 910, via wireless transmission, to the MAC 971 and the AM PTM RLC entity 961 via DTCH of the second end 950.

Figure 9D:
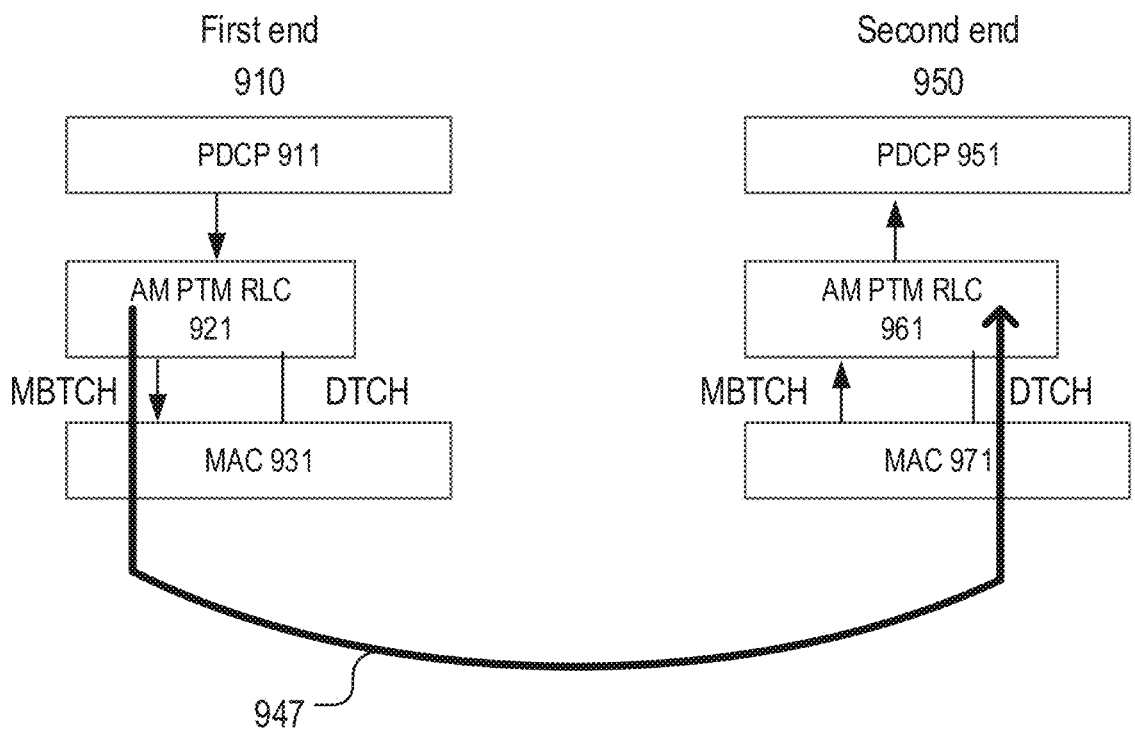
FIG. 9D shows an exemplary schematic diagram of a method for wireless communication.

In another implementation referring to FIG. 9D, a re-transmission 947 of one or more PDU may be performed from the AM PTM RLC entity 921 via MBTCH, and the MAC 931 of the first end 910, via wireless transmission, to the MAC 971 and the AM PTM RLC entity 961 via DTCH of the second end 950.

For one example of the embodiments, an AM PTM RLC entity at the first end may be implemented as described below.

In one implementation, at the first end, the AM PTM RLC Entity is associated to one the first logical channel used for PTM transmission, and multiple the second logical channels each of which is used for automatic repeat request (ARQ) for a specific second end via a PTP way.

In another implementation, at the second end, the AM PTM RLC Entity is associated to one the first logical channel used for PTM reception, and one the second logical channel used for ARQ via a PTP way.

In another implementation, there are three methods for the re-transmission.

Optionally and/or alternatively, one method may include that the re-transmission is via the second logical channel. It means that the second logical channel is responsible for PTP re-transmission, apart from reporting ARQ feedback.

Optionally and/or alternatively, another method may include that the re-transmission is via the first logical channel. It means that the second logical channel is only responsible for ARQ feedback. The re-transmission of RLC PDU uses the first logical channel.

Optionally and/or alternatively, another method may include that the network implementation may choose the first logical channel or the second logical channel or both for retransmitting an RLC SDU or an RLC SDU segment, for example, based on the number of UEs reporting negative acknowledgement for that RLC SDU or that RLC SDU segment.

For another example of the embodiments, RLC entity at the second end may be implemented as described below.

In one implementation for the AM PTM RLC entity at the second end, the AM PTM RLC Entity is associated with two logical channels: a first logical channel, and a second logical channel. The first logical channel is a logical channel for PTM. The second logical channel is a logical channel for PTP. The first logical channel may be a MBTCH. The second logical channel may be a DTCH.

In another implementation, when an AM PTM RLC entity receives RLC data PDUs from lower layer, it receives them through the associated two kinds of logical channels, and after forming RLC SDUs from the received RLC data PDUs, it delivers the RLC SDUs to upper layer through a single RLC channel between RLC and upper layer. In another implementation, when the AM PTM RLC entity submits RLC PDUs to lower layer, it submits them through the second logical channel.

In another implementation, at the second end, an AM PTM RLC entity sends STATUS PDUs to its peer AM PTM RLC entity via the associated the second logical channel in order to provide positive and/or negative acknowledgements of RLC SDUs (or portions of them).

In another implementation, at the second end, an AM PTM RLC entity receives AMD PDU with at least one of the following ways: from lower layers; from the associated first logical channel; from the associated second logical channel; from the associated first logical channel and the associated second logical channel; from all logical channels associated to this RLC entity.

In another implementation, after receiving a AMD PDU, the AM PTM RLC entity performs the receive operations in the same way as the PTP AM RLC Entity does.

In another implementation, when a STATUS reporting is triggered, the STATUS PDU is transmitted to the gNB via the corresponding second logical channel.

In another implementation, for AM PTM RLC entity configured by upper layers to send an RLC status report via the second logical channel, the AM PTM RLC entity may trigger a status report when one of the following conditions occurs: one condition includes polling from its peer AM RLC entity; and the other condition includes detection of reception failure of an AMD PDU.

In another implementation, for AM PTM RLC entity, the AM PTM RLC entity may trigger a status report when one of the following conditions occurs: one condition includes polling from its peer AM RLC entity; and the other condition includes detection of reception failure of an AMD PDU.

In another implementation, for an AM PTM RLC entity, the initial value for the following state variables are set as below.

One of the state variables is RX_Next—Receive state variable. This state variable holds the value of the SN following the last in-sequence completely received RLC SDU, and it serves as the lower edge of the receiving window.

Another of the state variables is RX_Highest_Status—Maximum STATUS transmit state variable. This state variable holds the highest possible value of the SN which can be indicated by "ACK_SN" when a STATUS PDU needs to be constructed.

Another of the state variables is RX_Next_Highest—Highest received state variable. This state variable holds the value of the SN following the SN of the RLC SDU with the highest SN among received RLC SDUs.

In another implementation, for the AM PTM RLC entity, at least one of (RX_Next, RX_Highest_Status, RX_Next_Highest) is initially set to the SN of the first received RLC PDU/RLC SDU/AMD PDU.

In another implementation, for the AM PTM RLC entity, at least one of (RX_Next, RX_Highest_Status, RX_Next_Highest) is initially set to the SN following the first received RLC PDU/RLC SDU/AMD PDU.

In another implementation, for an UM PTM RLC entity, the initial value for the following state variables are set as below.

One of the state variables is RX_Next_Reassembly—UM receive state variable. This state variable holds the value of the earliest SN that is still considered for reassembly. It is initially set to 0. For groupcast and broadcast of NR sidelink communication and MBS, it is initially set to the SN of the first received UMD PDU containing an SN.

Another of the state variables is RX_Next_Highest—UM receive state variable. This state variable holds the value of the SN following the SN of the UMD PDU with the highest SN among received UMD PDUs. It serves as the higher edge of the reassembly window. It may be initially set to 0. For groupcast and broadcast of NR sidelink communication and MBS, it is initially set to the SN of the first received UMD PDU containing an SN.

In another implementation, for MBS bearers, each PDCP entity is associated with one PTM RLC entity for PTM leg and/or one PTP RLC entity for PTP leg, the PTM RLC entity can be an AM RLC entity for MBS or an UM RLC entity, the PTP RLC entity can be an UM RLC entity or an AM RLC entity.

In another implementation of the embodiments, the second end receives a second information for each RLC bearer of MBS from a first end, where the second information indicates an RLC bearer configuration for MBS.

In one implementation, the second information comprises at least one of the following information: a temporal mobile group identity (TMGI) or an identity of a MBS service or session, a servedRadioBearer indicating the identity of the MBS bearer served by an RLC bearer, an identity of the first logical channel, an identity of the second logical channel, a fourth indication indicating which logical channel is used for PTP or PTM, an RLC configuration, a mac-LogicalChannelConfig which is used to configure second logical channel parameters.

In another implementation, the RLC configuration is used to set the configurable parameters of an RLC entity for MBS; and the RLC configuration for MBS comprises at least one of the following modes: an AM mode, a um-Bi-Directional mode, a um-Uni-Directional-UL mode, a um-Uni-Directional-DL mode, or a first RLC mode indicating the RLC entity uses AM RLC mode for MBS, wherein the RLC entity in the first RLC mode means that the RLC entity is a AM PTM RLC entity or a AM RLC entity for MBS, and the first RLC mode comprises at least one of the following: a sn-FieldLength, a t-Reassembly, or a fifth indication indicating whether the RLC bearer is configured to send an RLC status report in a uplink via the second logical channel.

In another implementation, in response to the RLC configuration in the second information being set as the first RLC mode, the second information comprises the fifth indication indicating whether the RLC bearer is configured to send an RLC status report in the uplink via the second logical channel.

In another implementation, when a PDCP status report is triggered, the second PDCP entity sends a PDCP status report in response that the fifth indication indicating the RLC bearer is configured to send an RLC status report in an uplink via the second logical channel.

In another implementation, in response to receiving the second information, the second end performs at least one of the following: configuring a MAC entity with a first logical channel; associating the first logical channel with a PDCP entity or RLC entity identified by a servedRadioBearer; or in response to an identity of the second logical channel being included or an PTM AM mode being configured in RLC configuration: configuring the MAC entity with a second logical channel in accordance to a received mac-LogicalChannelConfig, and associating the second logical channel with the PDCP entity or RLC entity identified by the servedRadioBearer, and considering the second logical channel as a PTP logical for the RLC entity.

For one example of the embodiments, a MBS bearer may be configured as described below.

In one implementation, the first end sends a second information for each RLC bearer of MBS to a second end, where the second information indicates the RLC bearer configuration for MBS.

In another implementation, the second information may configure an RLC entity, one or two corresponding logical channel in MAC and the linking to a PDCP entity (served MBS bearer).

In another implementation, the second information may include at least one of the following information: a TMGI or an identity of a MBS service/session, a servedRadioBearer which indicates the identity of the MBS bearer served by the RLC bearer, an identity of the first logical channel, an identity of the second logical channel, a fourth indication indicating which logical channel is used for PTP or PTM, an RLC configuration, a mac-LogicalChannelConfig which is used to configure the second logical channel parameters.

In another implementation, the RLC configuration is used to set the configurable parameters of an RLC entity for MBS. The RLC configuration for MBS can be set as one of the following modes: AM, um-Bi-Directional, um-Uni-Directional-UL, um-Uni-Directional-DL, or a first RLC mode indicating the RLC entity uses AM RLC mode for MBS. An RLC entity in the first RLC mode means that the RLC entity is an AM PTM RLC entity or an AM RLC entity for MBS.

In another implementation, the first RLC mode may include at least one of the following information: sn-FieldLength, t-Reassembly, and a fifth indication indicating whether the RLC bearer is configured to send an RLC status report in the uplink via the second logical channel.

In another implementation, the second information may include the fifth indication indicating whether the RLC bearer is configured to send an RLC status report in the uplink via the second logical channel, when the RLC configuration in the second information is set as the first RLC mode.

In another implementation, when the second information is received, the second end may perform at least one of the following steps.

Optionally and/or alternatively, one step includes that, when a logical channel with the given identity of the first logical channel is not configured within the same cell group, including the case when full configuration option is used, one or more of the following sub-step is performed.

Optionally and/or alternatively, one sub-step includes, if the servedRadioBearer associates the first logical channel with an SRB and RLC configuration is not included, establishing an RLC entity in accordance with the default configuration defined in an existing system for the corresponding SRB; or else, establishing an RLC entity in accordance with the received RLC configuration.

Optionally and/or alternatively, another sub-step includes, configuring this MAC entity with a first logical channel.

Optionally and/or alternatively, another sub-step includes, associating this first logical channel with the PDCP entity/RLC entity identified by servedRadioBearer.

Optionally and/or alternatively, another sub-step includes, if identity of the second logical channel is included (when PTM AM mode is configured in RLC configuration), configuring this MAC entity with a second logical channel in accordance to the received mac-LogicalChannelConfig, and/or associating this second logical channel with the PDCP entity/RLC entity identified by servedRadioBearer, and consider this logical channel as the PTP logical for this RLC entity.

Optionally and/or alternatively, another step includes that, if the UE's current configuration contains an RLC bearer with the received identity of the first logical channel within the same cell group, one or more of the following sub-step is performed.

Optionally and/or alternatively, one sub-step includes, if reestablishRLC is received, re-establishing the RLC entity as specified in an existing system.

Optionally and/or alternatively, one sub-step includes, reconfiguring the RLC entity or entities in accordance with the received RLC configuration;

Optionally and/or alternatively, one sub-step includes, reconfiguring the second logical channel in accordance with the received mac-LogicalChannelConfig.

In another embodiment, referring to FIG. 10, a method 1000 for wireless communication includes receiving multicast and broadcast service (MBS) data by a group of second ends from a first end. The method 1000 may include step 1010: receiving, by a second end of the group of second ends, a piece of information sent from the first end. The piece of information comprises at least one of the following: a first service identity indicating a MBS service or session in RAN, an indication on whether hybrid automatic repeat request (HARQ) feedback is enabled or disabled.

In one implementation, in response to the received indication indicating that the HARQ feedback is enabled, upon receiving the piece of information, the second end considers the HARQ feedback to be enabled for the MBS service identified by the received first service identity.

In another implementation, the first service identity comprises at least one of the following: a TMGI, an identity of a MBS service, or an identity of a MBS session.

In another implementation, in response to the received indication indicating that the HARQ feedback is disabled, upon receiving the piece of information, the second end considers the HARQ feedback to be disabled for the MBS service identified by the received first service identity.

In another implementation, in response to the second end receiving the piece of information, the piece of information is comprises in at least one of the following: a RRC signaling, a MAC CE, or a DCI.

In another implementation, in response to the group of second ends receiving the piece of information, the piece of information is comprises in at least one of the following: a system information block (SIB), a broadcast or multicast RRC signaling, a broadcast or multicast MAC CE, or a DCI.

For one example of the embodiments, HARQ may be enabled per UE per MBS service, or per MBS service as described below.

In one implementation, the third information includes at least one of the following information: a first service identity which indicates the MBS service/session in RAN, a sixth indication on whether HARQ feedback is enabled or disabled. The first service identity may be a TMGI, or an identity of a MBS service, or an identity of a MBS session.

In another implementation, upon receiving the third information, the second end considers HARQ feedback is enabled for the MBS service identified by the received first service identity if the received sixth indication indicates that HARQ feedback is enabled.

In another implementation, upon receiving the third information, the second end considers HARQ feedback is disabled for the MBS service identified by the received first service identity if the received sixth indication indicates that HARQ feedback is disabled.

In another implementation, the first end sends a third information to a second end. The third information may be included in a RRC signaling, a MAC CE, a DCI.

In another implementation, the first end sends a third information to a group of second ends. The third information may be included in a SIB (system information), a broadcast/multicast RRC signaling, a broadcast/multicast MAC CE, a DCI.

The present disclosure describes methods, apparatus, and computer-readable medium for wireless communication. The present disclosure addressed the issues with multicast broadcast services (MBS). The methods, devices, and computer-readable medium described in the present disclosure may facilitate the performance of wireless communication by receiving multicast and broadcast service (MBS) data by a group of second ends from a first end, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for wireless communication, comprising:
receiving multicast and broadcast service (MBS) data by a group of second ends from a first end by:
  receiving, by a second packet data convergence protocol (PDCP) entity at a second end of the group of second ends, the MBS data from a first PDCP entity at the first end, wherein the second PDCP entity comprises a first timer for at least one of the following: detecting a loss of at least one PDCP PDU, or triggering a PDCP status report; and
upon a second timer detecting a loss of at least one PDCP PDU expiring and a delivery-state variable being smaller than a next-state variable:
  updating, by the second PDCP entity, a reord-state variable to the next-state variable, wherein the reord-state variable indicates a count value following a count value associated with the PDCP PDU triggering the second timer;
  starting, by the second PDCP entity, the second timer;
  updating, by the second PDCP entity, a first state variable to the next-state variable; and
  starting, by the second PDCP entity, the first timer.

2. The method according to claim 1, wherein:
the first PDCP entity is associated with at least one of the following: a first point-to-multipoint (PTM) radio link control (RLC) entity for transmitting the MBS data via a PTM way, and a first point-to-point (PTP) RLC entity for a data transmission or reception via a PTP way.

3. The method according to claim 1, wherein:
the second PDCP entity is associated with at least one of the following: a second PTM RLC entity for receiving the MBS data via a PTM way, and a second PTP RLC entity used for receiving the MBS data from the first end and reporting or transmitting MBS feedback to the first end via a PTP way; and the MBS data comprises at least one of the following: MBS traffic data, or a control protocol data unit (PDU) for MBS.

4. The method according to claim 1, wherein:
the first end comprises at last one of the following: a base station, a radio access network (RAN) node, or a next-generation RAN (NG-RAN); and
the second end comprises a user equipment (UE).

5. The method according to claim 1, wherein:
the first PDCP entity delivers a PDCP protocol data unit (PDU) to an associated first PTM RLC entity for a PTM transmission.

6. The method according to claim 3, wherein:
the second PDCP entity receives a PDCP PDU from at least one lower layer;
the second PDCP entity submits a PDCP PDU to the associated second PTP RLC entity; and
wherein at least one lower layer comprises at least one of the following: the associated second PTP RLC entity, the associated second PTM RLC entity, one or more of all RLC entities associated to the second PDCP entity.

7. The method according to claim 1, wherein:
the second PDCP entity comprises a first state variable, wherein the first state variable comprises a count value following the count value associated with the PDCP PDU triggering the first timer.

8. The method according to claim 1, wherein:
for a MBS bearer, the second PDCP entity triggers a PDCP status report upon at least one of the following conditions:
an upper layer requests a PDCP entity re-establishment or a PDCP data recovery;
the first timer expires;
a reception of a poll notification from its peer entity where the poll notification is a PDCP control PDU from the first end; or
a mode switches between a PTP mode and a PTM mode.

9. The method according to claim 7, wherein:
upon the received PDCP PDU with a count value comprising a received count being not discarded, the second PDCP entity perform at least one of the following:
upon the first timer being running and a delivery-state variable being no smaller than the received count, stopping and resetting the first timer;
upon the first timer being not running and the delivery-state variable being smaller than a next-state variable, updating a first state variable to the next-state variable, and starting the first timer, and
wherein the delivery-state variable indicates a count value of a first PDCP SDU not delivered to a upper layer but still waited for, and the next-state variable indicates a count value of the next PDCP SDU expected to be received.

10. The method according to claim 1, wherein:
the first timer comprises a shorter cycle time than the second timer.

11. The method according to claim 1, wherein:
upon the first timer expiring, the second PDCP entity perform the following:
triggering a PDCP status report; and
upon a delivery-state variable being smaller than a next-state variable, updating a first state variable to the next-state variable, and starting the first timer.

12. The method according to claim 1, wherein:
upon the first timer being reconfigured by an upper layer while the first timer is running, the second PDCP entity perform the following:
updating a first state variable to a next-state variable; and
stopping and restarting the first timer.

13. The method according to claim 1, wherein:
the second end receives a first information from the first end, wherein the first information comprises at least one of the following information for a MBS bearer identified by a MBS bearer ID: a first PDCP configuration, a first RLC bearer configuration, or a second RLC bearer configuration.

14. The method according to claim 13, wherein:
the first PDCP configuration is used to set configurable PDCP parameters for the MBS bearer; and
the first PDCP configuration comprises at least one of the following:
a temporal mobile group identity (TMGI) or an identity of a MBS service or session,
a MBS bearer ID identifying a radio bearer for MBS,
a first indication indicating a cell group ID or LCID of a PTP RLC entity,
a second indication indicating the cell group ID or LCID of a PTM RLC entity,
a third indication indicating whether the MBS bearer is configured to send a PDCP status report in an uplink via a PTP RLC path, or
a first timer whose value is a period for triggering a PDCP status report.

15. The method according to claim 14, wherein
when a PDCP status report is triggered, the second PDCP entity sends a PDCP status report in response that the third indication indicating the MBS bearer is configured to send a PDCP status report in an uplink via the PTP RLC path.

16. An apparatus comprising:
a memory storing instructions; and
a processor in communication with the memory, wherein, when the processor executes the instructions, the processor is configured to cause the apparatus to perform receiving multicast and broadcast service (MBS) data by a group of second ends from a first end by:
receiving, at a second end of the group of second ends, the MBS data from a first packet data convergence protocol (PDCP) entity at the first end, wherein the second PDCP entity comprises a first timer for at least one of the following: detecting a loss of at least one PDCP PDU, or triggering a PDCP status report; and
upon a second timer detecting a loss of at least one PDCP PDU expiring and a delivery-state variable being smaller than a next-state variable:
updating a reord-state variable to the next-state variable, wherein the reord-state variable indicates a count value following a count value associated with the PDCP PDU triggering the second timer;
starting, by the second PDCP entity, the second timer;
updating a first state variable to the next-state variable; and
starting the first timer.

17. The apparatus according to claim 16, wherein:
the first PDCP entity is associated with at least one of the following: a first point-to-multipoint (PTM) radio link control (RLC) entity for transmitting the MBS data via a PTM way, and a first point-to-point (PTP) RLC entity for a data transmission or reception via a PTP way;
the apparatus is associated with at least one of the following: a second PTM RLC entity for receiving the MBS data via a PTM way, and a second PTP RLC entity used for receiving the MBS data from the first end and reporting or transmitting MBS feedback to the first end via a PTP way;

the MBS data comprises at least one of the following: MBS traffic data, or a control protocol data unit (PDU) for MBS;

the apparatus receives a PDCP PDU from at least one lower layer;

the apparatus submits a PDCP PDU to the associated second PTP RLC entity; and wherein at least one lower layer comprises at least one of the following: the associated second PTP RLC entity, the associated second PTM RLC entity, one or more of all RLC entities associated to the apparatus.

18. A non-transitory computer-readable medium storing instructions, wherein, the instructions, when executed by a processor, are configured to cause the processor to perform:

receiving multicast and broadcast service (MBS) data by a group of second ends from a first end by:

receiving, at a second end of the group of second ends, the MBS data from a first packet data convergence protocol (PDCP) entity at the first end, wherein the second PDCP entity comprises a first timer for at least one of the following: detecting a loss of at least one PDCP PDU, or triggering a PDCP status report; and upon a second timer detecting a loss of at least one PDCP PDU expiring and a delivery-state variable being smaller than a next-state variable:

updating a reord-state variable to the next-state variable, wherein the reord-state variable indicates a count value following a count value associated with the PDCP PDU triggering the second timer;

starting, by the second PDCP entity, the second timer;

updating a first state variable to the next-state variable; and starting the first timer.

* * * * *